US008333388B2

(12) United States Patent
Taft et al.

(10) Patent No.: US 8,333,388 B2
(45) Date of Patent: Dec. 18, 2012

(54) EXPANDABLE BELT MANDREL

(75) Inventors: Kevin H Taft, Williamson, NY (US); Sandra L Schmitt, Williamson, NY (US); Karen E Halliley, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 934 days.

(21) Appl. No.: 12/210,471

(22) Filed: Sep. 15, 2008

(65) Prior Publication Data

US 2010/0065675 A1 Mar. 18, 2010

(51) Int. Cl.
*B29C 33/76* (2006.01)
*B23Q 3/00* (2006.01)
*B23B 31/40* (2006.01)
*G03G 15/20* (2006.01)

(52) U.S. Cl. .................... 279/2.17; 279/2.22; 269/48.1; 118/500; 399/272; 399/328; 242/571.8; 29/895.22; 29/895.32

(58) Field of Classification Search .................. 279/2.1, 279/2.17, 2.22; 82/169; 269/48.1; 118/500; 399/272, 328; 242/571, 571.8; 264/311; 29/895.22, 895.32; *B29C 33/76; B23Q 3/00*
See application file for complete search history.

(56) References Cited

U.S. PATENT DOCUMENTS 1,980,468 A * 11/1934 Brauer .......................... 242/571
2,466,974 A * 4/1949 Stupakoff et al. ............ 279/2.17
2,647,701 A * 8/1953 Cannard .................... 242/571.8
2,746,497 A * 5/1956 Thompson .................... 144/205
2,749,133 A * 6/1956 Rich ............................ 279/2.12
2,992,787 A * 7/1961 Craig ......................... 242/597.1
3,045,944 A * 7/1962 Ciniglio ..................... 242/118.2
3,272,447 A * 9/1966 Lenwood et al. .......... 242/571.4
3,462,092 A * 8/1969 Mullins ...................... 242/571.8
3,561,699 A * 2/1971 Garrett et al. ................ 242/355
3,649,985 A * 3/1972 Hunt ............................... 15/179
3,900,913 A * 8/1975 Drumm ........................... 15/179
3,998,400 A * 12/1976 Gee et al. .................. 242/573.3
4,049,210 A * 9/1977 Pierce ........................... 242/477
4,422,590 A * 12/1983 Rathbone ................... 242/571.8
4,603,867 A * 8/1986 Babb et al. ........................ 279/3
4,770,456 A * 9/1988 Phillips et al. .................. 294/93
5,217,175 A * 6/1993 Stitz et al. .................. 242/571.8
5,367,769 A * 11/1994 Searcy et al. .............. 29/895.22
5,465,138 A * 11/1995 Jaskowiak et al. ............ 399/272
5,595,376 A * 1/1997 Hua ............................ 269/48.1
5,736,089 A * 4/1998 Stefani .......................... 264/255
6,316,113 B1 * 11/2001 Russell et al. ................ 428/450
6,438,841 B1 * 8/2002 Fuma et al. ................ 29/895.32
6,742,785 B1 * 6/2004 Weller ........................ 279/2.17
7,322,761 B2 * 1/2008 Silverbrook et al. ......... 400/614
2007/0190320 A1 * 8/2007 Longhenry et al. ........... 428/375

* cited by examiner

*Primary Examiner* — Eric A Gates
(74) *Attorney, Agent, or Firm* — Ronald E. Prass, Jr.; Prass LLP

(57) ABSTRACT

This is a mandrel used to fabricate seamless belts including those used in electrophotographic marking systems. The mandrel has a center core unit with two circular caps on each side. In between the caps is sandwiched a deformable O-ring which is outwardly deformed upon tightening of the two caps together. Once a tubular sheet is placed over the mandrel, the elastomeric O-ring will hold the sheet in place for further processing.

16 Claims, 3 Drawing Sheets

EXPANDABLE BELT MANDREL

This invention relates to a mandrel useful in the production of coated belts.

BACKGROUND

While the present mandrel invention can be used in any suitable coated belt production system, it will be described herein for clarity as used in the production of belts useful in electrostatic marking systems.

By way of background, generally, in a commercial electrostatographic reproduction apparatus (such as copiers/duplicators, printers or the like), a latent image charge pattern is formed on a uniformly charged photoconductive or dielectric member. Pigmented marking particles (toner) are attracted to the latent image charge pattern to develop such image on the dielectric member. A receiver member, such as paper, is then brought into contact with the dielectric member and an electric field applied to transfer the marking particle developed image to the receiver member from the dielectric member. After transfer, the receiver member bearing the transferred image is transported away from the dielectric member and the image is fixed or fused to the receiver member by heat and/or pressure to form a permanent reproduction thereon. In a typical fusing process where the toner is fused to the paper or receiving media, two rolls or belts are used through which the paper travels during the toner fusing. One roll or belt, usually the harder roll or belt, is a fuser member, the second is the pressure member or the softer roll or belt. "Fuser or pressure member as used throughout this disclosure includes both rolls and belts.

Typical pressure rolls or belts ("Softer Member") that are used in a fusing system have an elastomeric coating like silicone rubber which may or may not have a thin layer of another material over the surface of the member. A functional nip is formed when the softer member is pressed into the fuser member ("Harder Member"). The fuser member generally comprises a metal core with a hard Teflon (™ of DuPont) coating or thin elastomer.

The pressure or softer members are typically constructed of a cylindrical steel core or rod having positioned over it an elastomer or rubber material cylindrical coating. In any system when a hard (fuser member) is pressed against and contacts a softer member, nips are formed throughout the length of the pressure member in contact with the fuser member. These pressure zones ultimately cause the softer material to contact the support plates and create wear, shortening roll life and causing debris in the system. Also, once excessive wear takes place and an uneven nip is formed because of uneven coating, improper fusing of the toner can result causing imperfect copies on the paper or receiving member. In addition, because of this wear problem caused by non-precise surface coating, frequent changes requiring new softer members are required. Generally, the elastomeric members have typically been manufactured from a single elastomeric material, such as silicon rubber, of a uniform hardness as determined by a durometer. From both a cost standpoint and performance standpoint, any improvement in the softer and harder member, construction that would extend roll life and improve performance at the fuser station would be very desirable. Also, eliminating an uneven nip and material deterioration of the pressure member would extend pressure and fuser member life and substantially improve fusing performance. An improved method for precisely coating fusing members will substantially eliminate or lessen deterioration of these fusing members.

Prior to the present invention, this was no efficient and inexpensive method to securely hold onto a large (such as a) 300 mm diameter belt during the surface coating steps. An efficient system is needed to allow a user to apply precision coatings and execute precise process steps in making fusing members or other coated belts.

SUMMARY

The expandable mandrel of this invention allows a large belt to be held precisely on the centers of lathes and other equipment. One object of this invention is to avoid the costs of purchasing a prior art expensive alternative that generally consisted of an air-filled bladder chuck.

This invention describes a mandrel developed and used to fabricate in one embodiment fuser belts or other non-xerographic related coated members. This mandrel was specially developed as nothing is now commercially available that meets the rigid requirements for precise belt manufacturing. It consists in one embodiment of two sets of end caps, two Viton "O" rings, (VITON is a ™ of DuPont) an aluminum core, a piece of thin tubular stainless steel sheeting and about a 1 mm thick circular silicone belt. The stainless steel sheet is rolled over itself in a circular shape smaller than that of the silicone belt and is placed inside the silicone belt. The silicone belt eliminates the seam where the steel sheet overlaps itself and acts to hold the polyimide belt in place. In making a fuser belt, a polyimide belt that will be the substrate for the manufactured belt is then slipped over the silicone belt. In non-xerographic use, any suitable substrate that is to be coated may be used. The end caps and core are placed inside the steel sheet and the end caps are tightened axially. The end caps house the O-rings in a nest slightly smaller than the width of the O-ring. As the end caps are drawn together with screws, the O-rings expand outwards, pushing against the steel sheet and silicone belt, securing the polyimide belt onto the assembly with a consistent force in a nearly perfect circular shape. Finally, the assembly is mounted in a lathe and fuser belts are manufactured by flow coating a material, like silicone, onto a polyimide belt substrate, followed by other layers of Viton or Teflon (both trademarks of DuPont) on top of the silicone. This invention was implemented and shown to work well in producing 302 mm diameter fuser belts. Other size mandrels could be made for different diameter belts. This mandrel was specially developed because nothing is commercially available that meets the requirements including notably the need to withstand high belt curing temperature. Another key advantage of the present mandrel is creating an essentially perfect circular shape suitable substrate for flow coating. This is an efficient configuration that is a key enabler for seamless belt manufacture for fusing or ITB applications and could have useful potential to manufacturing equipment suppliers or for various other types of belts including in other industries not related to xerography.

DETAILED DISCUSSION OF DRAWINGS AND PREFERRED EMBODIMENTS

Figure 1:
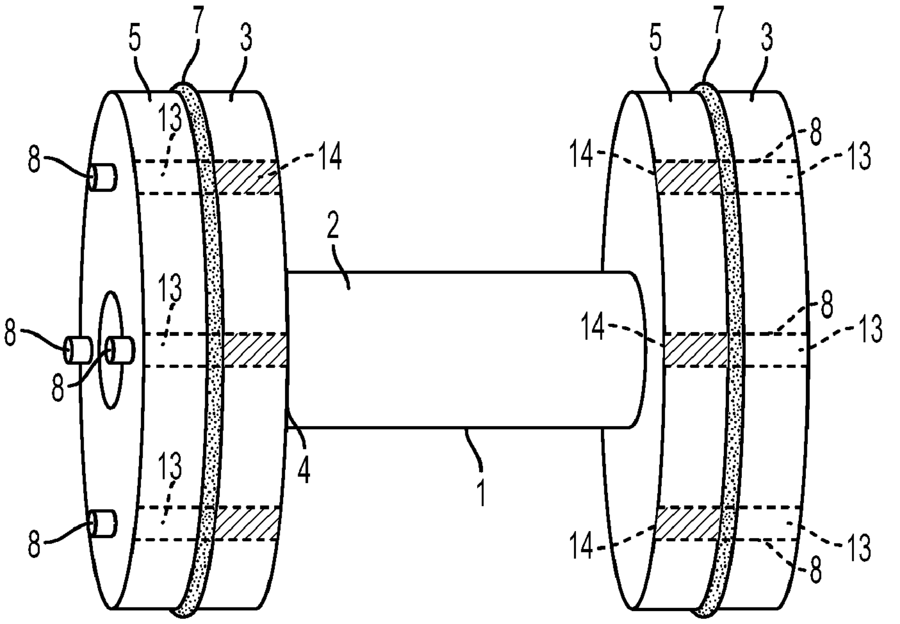
FIG. 1 illustrates an embodiment of the mandrel of this invention.
Figure 2:
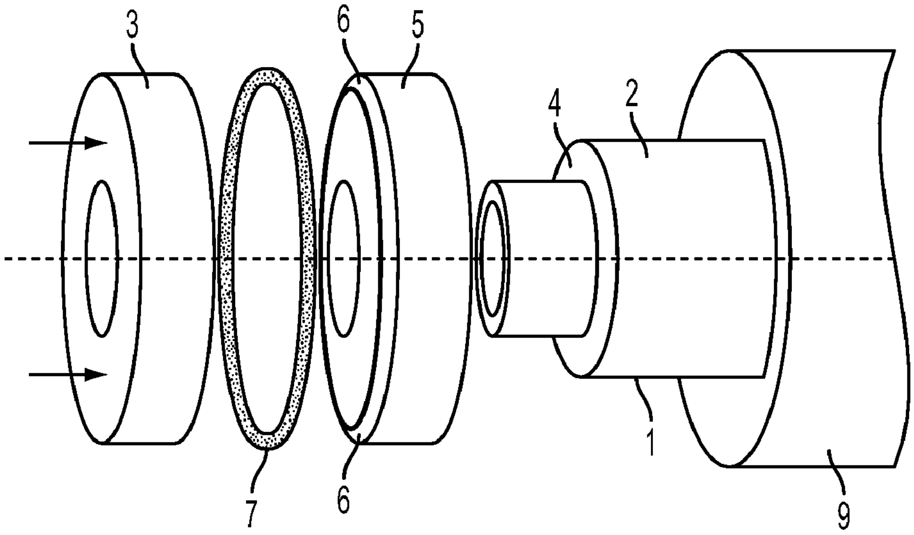
FIG. 2 illustrates an expanded view of one end of an embodiment of a mandrel of this invention.

In FIGS. 1 and 2, mandrel 1 comprises a center core 1 that has precision-bearing surfaces 2 and precision centers. From there a round aluminum plate 3 is fastened to each end portion 4 of the center core 1. In this embodiment, a second plate 5 with a groove 6 machined into the outer perimeter and the O-ring 7 is placed over the journal. The O-ring 7 is then nested into the grooved cannel 6 and then sandwiched between the two plates 3 and 5. Four Allen bolts or other tightening means 8 are then tightened evenly to squeeze the plates 3 and 5 together forcing the O-ring to deform out, precisely spacing the belt 9 to subsequently be placed on the mandrel for precision processing. Concentricity is key as the coatings that are being applied to the belt 9 while on a lathe are very thin. The coated belt is designated as 9, the specific coatable polyimide belt is designated as 12, but in many instances they are the same.

In FIG. 1, threaded bolts 8 are shown in (at the top) partially dotted lines connecting plates 3 and 5. The portion 13 of bolt 8 is not threaded while portion 14 is threaded as shown in FIG. 1. Any suitable bolt or plate connecting means may be used in place of the illustrated bolts.

The channel or groove 6 may be placed in either or both plates 3 and 5 so that an O-ring 7 may be placed therebetween. The important feature is that the O-ring be placed between plates 3 and 5 so that upon tightening these plates, the deformable O-ring will bulge outwardly as shown in FIGS. 1 and 3.

Figure 3:
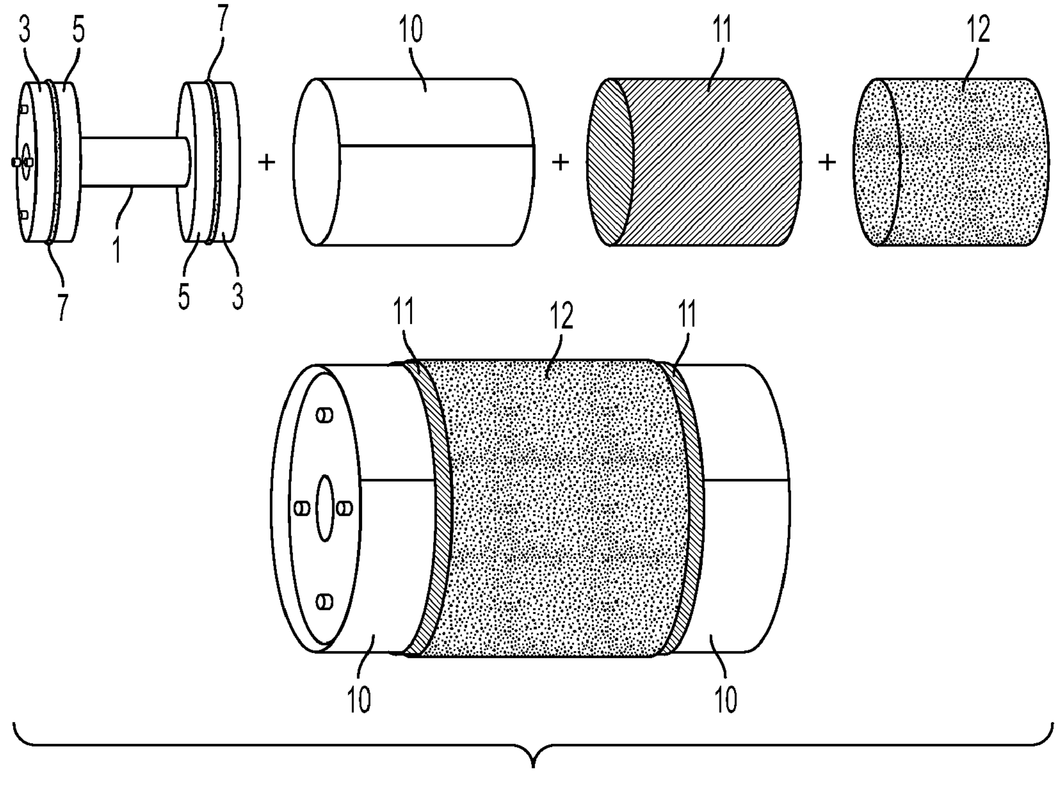
FIG. 3 illustrates the mandrel of this invention and the components used to form a typical fusing member.
Figure 4:
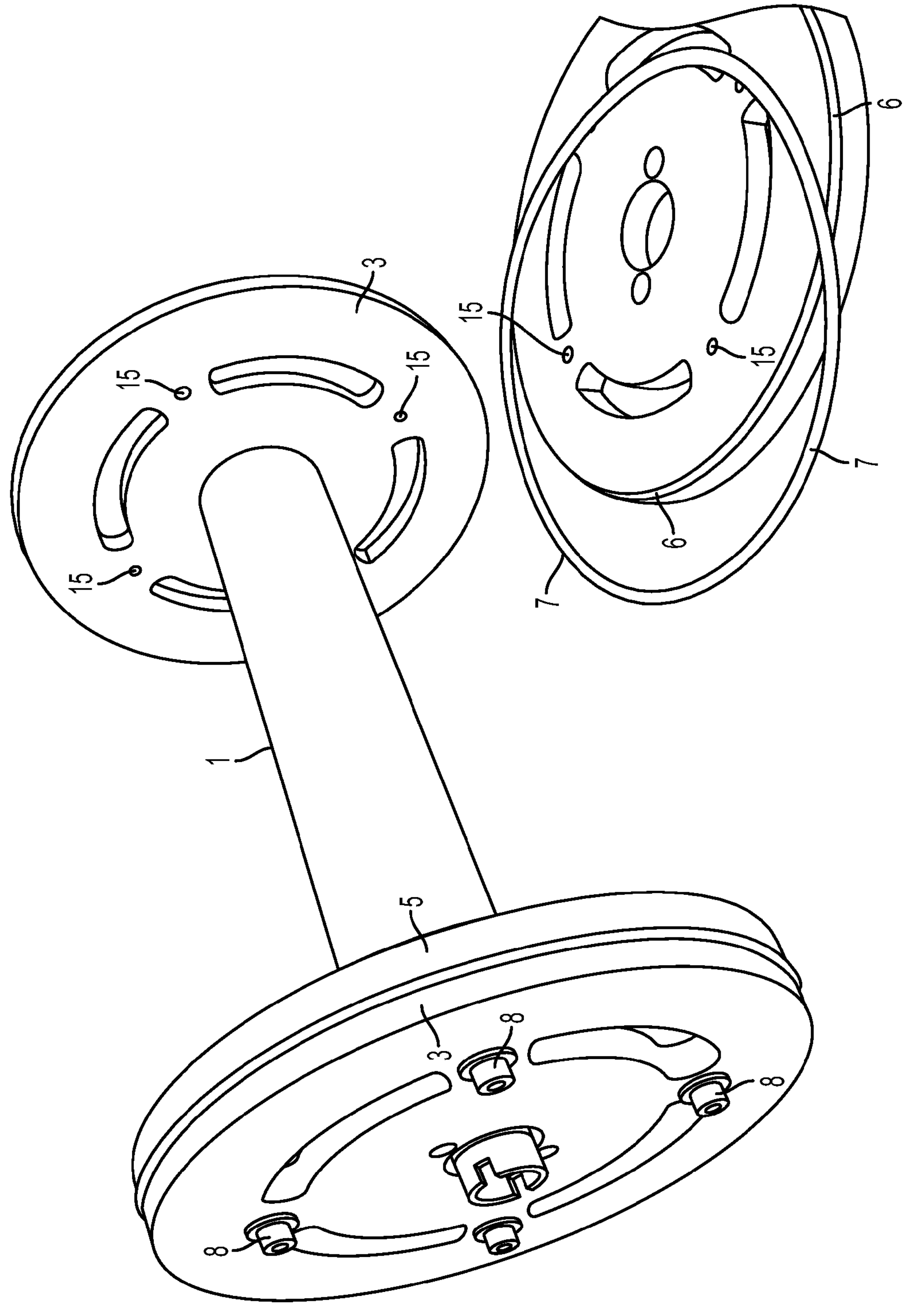
FIG. 4 is a disassembled view of an embodiment of the mandrel of this invention.

16 In FIG. 3, this mandrel is developed and used to fabricate seamless silicone, Viton and Teflon fuser or pressure belts. This mandrel 1 was specially developed as nothing is commercially available that meets the requirements for precise belt manufacturing. The mandrel in one embodiment consists of two sets of end caps 3 and 5, two Viton O-rings 7 (VITON is a trademark of DuPont), an aluminum core 1, a piece of thin stainless steel sheeting 10 and a ~1 mm thick circular silicone belt 11. The circular silicone belt 11 can be of any suitable thickness such as from about 1 mm to 17 mm. The stainless steel sheet 10 is rolled over itself in a circular shape smaller than that of the silicone belt 11 and is placed inside the silicone belt 11. The silicone belt 11 eliminates the seam where the steel sheet 10 overlaps itself and acts to hold the polyimide belt (or other suitable substrate) 12 in place. A polyimide belt 12 that will be the substrate for the manufactured fuser belt is then slipped over the silicone belt 11. The end caps 3 and 5 and core 1 are placed inside the steel sheet 10 and the end caps 3 and 5 are tightened axially. In the embodiments of FIGS. 3 and 4, the O-ring fits into a groove machined in the inner face of the first round plate 3. The end caps 3 and 5 house the O-rings 7 in a nest slightly smaller than the width of the O-ring. As the end caps 3 and 5 are drawn together with screws 8, the O-rings 7 expand outwards pushing against the steel sheet 10 and silicone belt 11 securing the polyimide belt 12 onto the assembly with a consistent force in a nearly perfect circular shape. Finally, the assembly is mounted in a lathe and belts are manufactured by flow coating a material, e.g. silicone, onto a polyimide (or other substrate) belt 12 substrate followed by other layers of Viton or Teflon on top of the silicone. VITON and TEFLON are trademarks of DuPont.

In FIG. 4 the mandrel of this invention is disassembled to show its component parts. On the left side of center core 1 are connected round plates 3 and 5, each having bore holes 15 to receive partially threaded bolts 8. Either plate 3 or 5 can have a groove 6 machined around its periphery to hold an O-ring 7 when assembled. In the embodiment of FIG. 4, the groove 6 is machined into the inner face of round plate 5. Any suitable number of O-rings 7 may be used. Once bolts 8 are tightened as shown in FIG. 1, the O-ring will deform outwardly beyond the outer circumference of plates 3 and 5 as shown so that when metal plate 10 is assembled over the O-rings, the plate 10 will be held firmly by the deformed O-rings. The second plate 5 when tightened by bolts 8 is forced against shoulder 4 end of center core to be held firmly in place; see FIG. 2 for placement of shoulder 4.

In summary, this invention provides a mandrel useful in the manufacture of coated belts, the mandrel comprising a center tubular core having plates on each of its end portions, a first round metal plate secured to said tubular core. The first or second round plates have a groove channel concentrically machined adjacent the inside face of its inner perimeter. A deformable O-ring is nested into the grooved channel and sandwiched between the first and second round plates. There are bolts positioned in the first round plate on its outer portion and adapted to be tightened evenly to squeeze the first and second round plates together thereby forcing a portion of said O-ring outwardly beyond the outer perimeters of the first and second round plates. The O-ring is configured thereby to substantially equally space a belt to be positioned on and over the O-rings and mandrel prior to precision coating said belt.

The bolts are equally spaced around an outside portion of the first round plate. The O-ring comprises a silicone O-ring. The first round metal plate is preferably constructed of aluminum. The first and second round plates are coextensive and have equal configured center openings adapted to fit around the center tubular core.

Embodiments of this invention provide a device useful in a process of applying a uniform coating on a belt structure. The device comprises a mandrel, a metallic tubular sheet enabled to fit around the mandrel, a flexible belt enabled to fit around the metallic tubular sheet, and a coatable belt structure enabled to fit around the flexible belt and providing a substrate to be coated. The mandrel comprises a center tubular core having attached on each of its end portions a first and second round plate. At least one of the round plates has a groove channel machined on its inner face abutting the other plate, and an O-ring fitted into the channel and enabled to be squeezed and deformed outwardly upon tightening together of the first and second round plates. The mandrel has at least four bolts equally spaced around an outside portion of the first round plate. The O-ring is elastomeric and deformable. The first round metal plate is preferably constructed of aluminum. The first and second round plates are coextensive and have equally configured center openings adapted to be connected to and fit around the center tubular core.

Also provided by embodiments of this invention is a process for the production of a fuser belt useful in a xerographic marking system. This process comprises providing a mandrel, providing a metallic tubular sheet enabled to fit around said mandrel, providing a flexible belt enabled to fit around said metallic tubular sheet, and providing a belt structure enabled to fit around said flexible belt thereby providing a substrate to be coated to form a fuser belt. The mandrel comprises a center tubular core having on each of its end portions a first round metal plate attached to the tubular core, a second round plate secured to the tubular core. The first and/or second round plate has a groove channel concentrically machined adjacent the inside face of its outer perimeter. A deformable O-ring is nested into the grooved channel and is sandwiched between the first and second round plates. There are bolts positioned in the first round plate and adapted to be tightened evenly to squeeze the first and second round plates together thereby forcing a portion of said O-ring outwardly beyond the perimeters of the first and second round plates.

This provides substantially equally spacing a coatable belt to be positioned on the mandrel prior to precision coating the belt. The bolts are equally spaced around an outside portion of the first round plate. The O-ring is a silicone O-ring. The first round metal plate is constructed of aluminum, the first and second round plates are coextensive and have center openings adapted to fit around the center tubular core. The metallic tubular sheet is a stainless steel sheet, the flexible belt is a seamless silicone belt, and the coatable belt structure is a polyimide belt.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A mandrel useful in the manufacture of coated belts, said mandrel comprising:
- a center tubular core having on each of its end portions;
- a first round metal plate attached to said tubular core,
- a second round plate secured to said tubular core, one of said first or said second round plates having a grooved channel concentrically machined adjacent the inside face of its inner perimeter, and the other of said first or said second round plates having a planar surface, the first round plate and the second round plate being separate from, and greater in diameter than, the center tubular core,
- a deformable O-ring nested into said grooved channel and sandwiched between said plate having said grooved channel and said planar surface of the other of said first and said second round plates,
- bolts positioned in said first round plate on its outer portion and adapted to be tightened evenly to squeeze said first and second round plates together thereby forcing a portion of said O-ring outwardly beyond outer perimeters of said first and second round plates,
- configured thereby to substantially equally space a belt to be positioned on and over said mandrel prior to precision coating said belt.

2. The mandrel of claim 1 wherein said bolts are equally spaced around an outside portion of said first round plate.

3. The mandrel of claim 1 wherein said O-ring is a silicone O-ring.

4. The mandrel of claim 1 wherein said first round metal plate is constructed of aluminum.

5. The mandrel of claim 1 wherein said first and second round plates are coextensive and have equal configured center openings adapted to fit around said center tubular core.

6. A device useful in a process of applying a uniform coating on a belt structure, said device comprising:
- a mandrel,
- a metallic tubular sheet enabled to fit around said mandrel,
- a flexible belt enabled to fit around said metallic tubular sheet, and
- a belt structure enabled to fit around said flexible belt and providing a substrate to be coated,
- said mandrel comprising a center tubular core having attached on each of its end portions a first and second round plates, the first round plate and the second round plate being separate from, and greater in diameter than, the center tubular core,
- one of said first and said second round plates having a groove channel machined on its inner face abutting the other plate, and
- an O-ring fitted into said channel and enabled to be squeezed and deformed outwardly upon tightening together of a planar surface of one of said first and said second round plates against the O-ring fitted into said channel.

7. The mandrel of claim 6 wherein at least four bolts are equally spaced around an outside portion of said first round plate.

8. The mandrel of claim 6 wherein said O-ring is a silicone O-ring.

9. The mandrel of claim 6 wherein said first round metal plate is constructed of aluminum.

10. The mandrel of claim 6 wherein said first and second round plates are coextensive and have equally configured center openings adapted to be connected to and fit around said center tubular core.

11. A process for the production of a fuser belt useful in a xerographic marking system which comprises:
- providing a mandrel,
- providing a metallic tubular sheet enabled to fit around said mandrel,
- providing a flexible belt enabled to fit around said metallic tubular sheet, and
- providing a belt structure enabled to fit around said flexible belt thereby providing a substrate to be coated to form a fuser belt,
- said mandrel comprising:
- a center tubular core having on each of its end portions,
- a first round metal plate attached to said tubular core,
- a second round plate secured to said tubular core, said second round plate having a groove channel concentrically machined adjacent the inside face of its outer perimeter,
- a deformable O-ring nested into said grooved channel and sandwiched between said first and second round plates, wherein a planar surface of said first plate contacts said O-ring nested in said grooved channel of said second plate,
- bolts positioned in said first round plate and adapted to be tightened evenly to squeeze said first and second round plates together thereby forcing a portion of said O-ring outwardly beyond the perimeters of said first and second round plates,
- thereby substantially equally spacing a belt to be positioned on said mandrel prior to precision coating said belt.

12. The process of claim 11 wherein said bolts are equally spaced around an outside portion of said first round plate.

13. The process of claim 11 wherein said O-ring is a silicone O-ring.

14. The process of claim 11 wherein said first round metal plate is constructed of aluminum.

15. The process of claim 11 wherein said first and second round plates are coextensive and have center openings adapted to fit around said center tubular core.

16. The process of claim 11 wherein said metallic tubular sheet is a stainless steel sheet, said flexible belt is a seamless silicone belt, and said belt structure is a polyimide belt.

* * * * *